Sept. 23, 1958     E. P. WIGNER ET AL     2,853,624
RADIATION SHIELDING DEVICE
Filed May 22, 1945

Witnesses:
Hubert E. Metcalf
Richard E. Burn

Inventor:
Eugene P. Wigner
Gale J. Young
By: Robert A. Kavanaugh
Attorney even when a neutronic reactor is operating at a high power output of 100,000 kilowatts or more inside of said shield.

2,853,624

RADIATION SHIELDING DEVICE

Eugene P. Wigner and Gale J. Young, Chicago, Ill., assignors to the United States of America as represented by the United States Atomic Energy Commission Application May 22, 1945, Serial No. 595,184

5 Claims. (Cl. 250—108)

This invention relates to radiation shielding devices and more particularly to a radiation shield that is suitable for the protection of personnel from both gamma rays and neutrons.

In the operation of certain devices known as neutronic reactors a neutron fissionable isotope such as $U^{233}$, $U^{235}$, or $94^{239}$ or mixtures thereof is subjected to fission by absorption of neutrons and a self-sustaining chain reaction is established by the neutrons evolved by the fission. In general such reactors comprise bodies of compositions containing such fissionable material, for example, natural uranium, disposed in a neutron slowing material which slow the neutrons to thermal energies. Such a slowing material is termed a neutron moderator. Carbon, beryllium, and $D_2O$ (heavy water) are typical moderators suitable for such use. Specific details of the theory and essential characteristics of such reactors are set forth in copending application of Enrico Fermi and Leo Szilard, Serial No. 568,904, filed December 19, 1944, now Patent No. 2,708,656, issued May 17, 1955.

In the operation of a neutronic reactor, a large quantity of neutrons and gamma rays as well as alpha and beta rays are released. It is essential that personnel working around said reactors be protected from these types of radiation as they have detrimental biological effects.

Therefore, it is an object of this invention to provide a method and device that will protect personnel from radiations, especially all types of radiation which emanate from a neutronic reactor.

Another object of the invention is to provide a type of shielding which will be easy to construct, low in cost and occupy a relatively small space.

Figure 1:
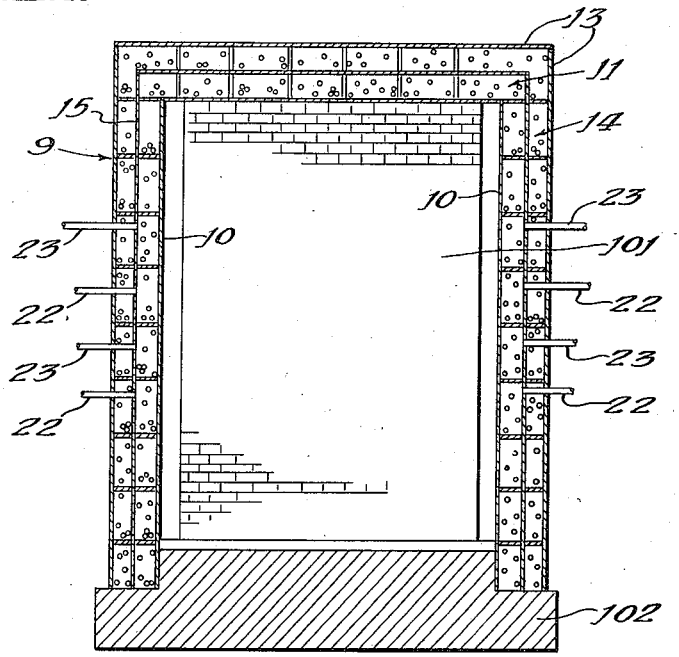
Figure 2:
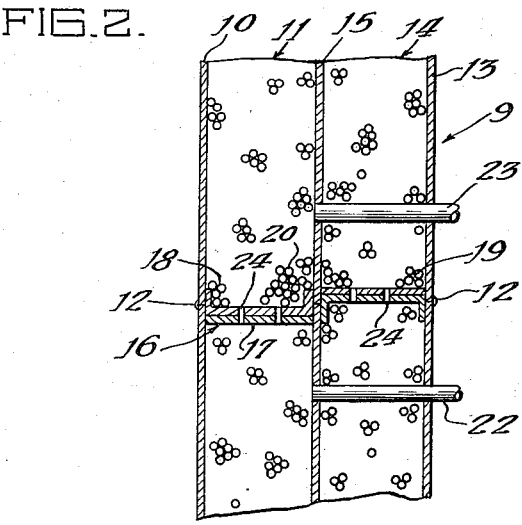

These and other objects are obtained by the novel construction, combination of material and arrangement of said materials hereinafter described and shown in the accompanying drawing in which:

Fig. 1 is a view of a neutronic reactor surrounded by a shield embodying our invention, the reactor being shown in elevation and the shield in cross-section; and Fig. 2 is cross-section of Fig. 1, only a few of the metal shields being shown.

In the past, alpha, beta and gamma rays have been absorbed according to well established principles by shields of metal, usually lead, but these shields in practical thicknesses are inadequate for the absorption of neutrons. Some of the neutrons emanating from a neutronic reactor are "fast" neutrons which may have energies well over one million electron volts and are capable of passing through great thicknesses of dense materials, such as, lead. These "fast" neutrons are not readily absorbed until they are slowed to thermal energies but it has been discovered that by using a composite shield of a neutron slowing material, also called a moderator, and a neutron and gamma ray absorbing material, it is possible to reduce the amount of radiation passing through said shield to a point at which it is safe for personnel to work close to the outside of said shield even when a neutronic reactor is operating at a high power output of 100,000 kilowatts or more inside of said shield.

Light elements are suitable for said moderating material in a shield, because they have the ability to slow fast neutrons to thermal energies by means of elastic collisions. A fast neutron colliding with the nuclei of the light elements in a series of collisions gradually looses its speed until it is slowed to thermal energy. Light elements such as beryllium, carbon, or deuterium, are suitable for use as a slowing material, but they do not readily absorb either fast or slow neutrons and they are all comparatively expensive; therefore, we prefer to use a hydrogen containing, hereafter called hydrogenous, material for the moderator in the shield. Hydrogen, as well as being an excellent moderator, is a relatively good absorber of slow neutrons. Furthermore, it is readily available and cheap in the form of water. However, a shield comprised only of water in a thin walled container would have to be very thick in order to reduce the radiation emanating from a reactor to a tolerable quantity. In addition to the unwieldiness of such a shield, a large concentration of fast neutrons absorbed by said water may dissociate the water into hydrogen and oxygen. This dissociation presents an additional problem of providing means to eliminate the gases.

When the fast neutrons have been slowed by the moderator to thermal energy, they are readily absorbed by several elements such as boron, cadmium, gadolinium, samarium and iron. Any of these elements could be used with the slowing material to form a shield but we prefer to use an iron-containing material such as steel. Steel is very advantageous because it has high structural strength; and it has a relatively high capture cross-section for slow neutrons, for which reason it is a good absorber for slow neutrons. A small quantity of boron added to steel will increase its effectiveness as a neutron absorber. Iron is also more effective than most metals in slowing fast neutrons by means of inelastic collisions. In inelastic collisions the neutron energy is used up in providing an excited state of the iron nucleus, which later emits energy as a gamma ray.

Iron is also an excellent absorber of gamma rays. This is an essential feature in a reactor shield, since the absorption of a neutron particularly by iron nucleus releases a gamma ray of approximately six million electron volts energy for every neutron absorbed. As has been explained above, said gamma rays are dangerous to personnel and therefore it is essential that said rays be absorbed before reaching the exterior of the shield. A proper thickness of iron will absorb said gamma rays.

In a preferred embodiment of our invention, the iron and water are present in the shield in approximately equal amounts by volume. In one construction, the iron is in the form of spherical or irregularly shaped steel or iron bodies enclosed in an iron tank with water filling the interstices between the iron bodies. Thus, the water and iron are interspersed in each other so that a fast neutron entering the shield is slowed by the hydrogen in the water or by inelastic collisions with the iron and as soon as it reaches the proper energy at which it may be properly absorbed, said neutron is sure to be close to either a hydrogen nucleus or an iron nucleus which will absorb it.

Turning now to the drawing, one embodiment of the invention is shown. A shield 9 in the form of a double steel or iron tank surrounds a neutronic reactor 101 (shown schematically) on four sides and the top. The shield 9 and reactor 101 are supported on a heavy concrete base 102. The inside wall 10 of the interior tank 11 adjacent the reactor 101 is made up of a series of heavy steel plates welded together by welds 12. The exterior wall 13 of the outer tank 14 and the common wall 15 are similar in construction. The inner tank 11 is divided into a series of compartments by means of transverse partitions 16. These comprise flat plates 17 which extend from the inner wall 10 to the common wall 15 and are welded in place. Resting on each plate 17 is a U-shaped plate 18 with the arms of the U extending behind the welds 12, as shown. Similar partitions 19 divide the outer tank 14 into compartments. In each partition 19 the arms of the U-shaped plate extend in the opposite direction from the corresponding plate of the inner tank 11 so that said arms cover the inner portion of welds 12 connecting the plates of exterior wall 13. The partitions 16 and 19 have vertical perforations 24 so that water may pass freely from one section of each tank to another section of the same tank. The common wall 15 is water tight so that no water may pass between the inner tank 11 and outer tank 14. The tanks 11 and 14 are filled with steel or iron spheres 20. The perforations 24 in partitions 16 and 19 are of such a size that the spheres 20 cannot pass therethrough. The shield 9 may extend only around the reactor 101 if desired, the top portion being omitted.

In absorbing radiation, heat is given off, so if the described shield is to be used with a high power reactor means must be provided for cooling the contents of said shield. Water is admitted to the tank 11 of the shield through inlet pipes 22 and is withdrawn therefrom by outlet pipes 23, as shown in the drawing. Cool water may be admitted constantly as the outlet water may be circulated through a cooling system, not shown, and readmitted to tank 11. Similar circulation may be provided in the outer tank 14 if desirable, but usually this is unnecessary as most of the heat will be liberated in the inner tank where most of the neutron absorption takes place. In any case, it is desirable to keep the water in the inner tank 11 separate from that in the outer tank 14 as impurities present in the water in the inner tank may become radioactive due to absorption of neutrons, and, therefore, it is important that the water in the outer tank 14 be kept relatively non-radioactive since only the plate 13 may separate this water from the personnel working around the exterior of said shield.

A shield as described, one meter in thickness, has been found satisfactory for shielding a neutronic reactor operating at 100,000 kilowatts.

While there has been described a preferred embodiment of the present invention, it will be understood that changes may be made without departing from the spirit of the invention. The above disclosure is to be regarded as descriptive and illustrative only, and not as restrictive of the invention which is limited only by the appended claims.

The following claims are made:

1. A device for shielding from nuclear particles and radiations consisting of a vessel having a liquid-tight partition forming two opposed portions of the vessel, a plurality of bodies dispersed throughout the vessel, said bodies being constructed of non-fissionable material that absorbs thermal neutrons, a liquid filling the interstices between said bodies, said liquid consisting of neutron-slowing material, and means to circulate the liquid through a circulation path including only one of said portions of the vessel.

2. In combination with a nuclear fission radiation source, a shield for nuclear particles and radiations adjacent to said source comprising a hollow wall and an aggregate consisting of iron and water in approximately equal amounts by volume substantially filling said wall.

3. The combination of claim 2 wherein there are provided means to circulate the water through a circulation path including at least a portion of the wall.

4. The combination of claim 2 wherein the iron is in the form of spherical bodies.

5. The device of claim 1 wherein the bodies are of iron and the liquid is water.

References Cited in the file of this patent

UNITED STATES PATENTS

| | | |
|---|---|---|
| 1,537,925 | Bolin | May 12, 1925 |
| 1,580,857 | Richards | Apr. 13, 1926 |
| 1,689,951 | Lofland | Oct. 30, 1928 |
| 2,045,808 | Smyly | June 30, 1936 |
| 2,206,634 | Fermi et al. | July 2, 1940 |
| 2,303,709 | Siegert | Dec. 1, 1942 |
| 2,391,723 | Mann | Dec. 25, 1945 |

FOREIGN PATENTS

| | | |
|---|---|---|
| 114,150 | Australia | May 2, 1940 |
| 861,390 | France | Oct. 28, 1940 |